No. 724,362. PATENTED MAR. 31, 1903.
A. W. WILSON.
LINK FOR FISHING GEAR.
APPLICATION FILED APR. 26, 1902.
NO MODEL.
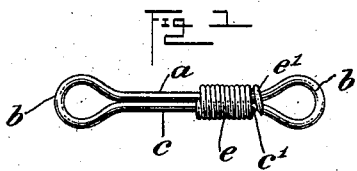
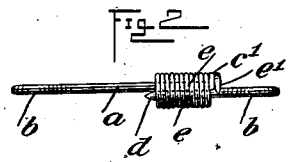
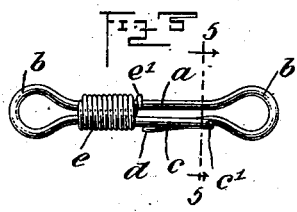
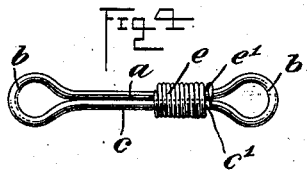
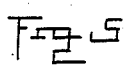
WITNESSES:
INVENTOR
Albert W. Wilson
BY
ATTORNEYS.

UNITED STATES PATENT OFFICE.

ALBERT WING WILSON, OF SAN FRANCISCO, CALIFORNIA.

LINK FOR FISHING-GEAR.

SPECIFICATION forming part of Letters Patent No. 724,362, dated March 31, 1903.

Application filed April 26, 1902. Serial No. 104,783. (No model.)

*To all whom it may concern:*

Be it known that I, ALBERT WING WILSON, a citizen of the United States, and a resident of San Francisco, in the county of San Francisco and State of California, have invented a new and Improved Link for Fishing-Gear, of which the following is a full, clear, and exact description.

This invention relates to a link used for connecting the line or leader to the spoon, bait, or other lure in fishing-tackle.

The object is to construct the link so that it may be opened at will and yet held securely, so that it cannot be torn apart by the strains to which it is ordinarily subjected.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side view of the link closed. Fig. 2 is an edge view of the same. Fig. 3 is a side view showing the link open. Fig. 4 is a similar view showing the parts in the movement of closing or opening, and Fig. 5 is a cross-section on line 5 5 of Fig. 3.

The link is preferably formed of an integral section of wire bent to produce a continuous middle portion $a$, terminating in eyes $b$, and end portions $c$ and $d$, lying inward from the eyes $b$ alongside of the continuous middle portion $a$. The end portion $c$ is formed with a laterally-projecting stud $c'$. Fitted around the middle portion of the link is a sleeve $e$, formed of coiled wire, one end, $e'$, of said coil being separated from the main part of the coil to form a holder for the stud $c'$.

To open the link, the sleeve or holder $e$ should be moved into the position shown in Fig. 3, whereupon the short end $d$ is disengaged, and the spoon or lure may be connected with the right-hand eye $b$, the other eye $b$ serving to carry the line or leader, or vice versa, as may be desired. Then to close the link the sleeve should be moved into the position shown in Fig. 4, so that the holder $e'$ will be in transverse line with the stud $c'$. Then upon turning the sleeve around the link the end or holder $e'$ will embrace the stud $c'$, and thus the holder will be held against longitudinal movement. This holder or sleeve $e$ serves to keep the ends $c$ and $d$ of the link held snugly against the main or middle part $a$. It will therefore be observed that when the link is closed it is securely locked, and it will be impossible for the spoon or lure to be disconnected from the link after having once been made secure.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. The combination of an open link, comprising an end portion with a lateral stud thereon, and a sleeve working on the link to confine said end portion, the sleeve having a holder to engage the said stud, the said sleeve being formed of a coil of wire and the holder comprising the end of said coil, said end being separated from the body of the coil to receive the stud.

2. The combination of an open link, comprising a shank or middle portion, an eye at each end and end portions projected inward from the eyes past each other, and a sleeve movable on the shank between the eyes and capable of inclosing the said end portions to confine them, the sleeve including a holder coacting with one of the end portions of the link to keep the link in closed adjustment.

3. The combination of an open link, comprising a shank or middle portion, an eye at each end and end portions projected inward from the eye past each other, and one end portion having a lateral stud thereon, and a sleeve working on the link between the eyes to confine said end portions, the sleeve having a holder to engage the stud, whereby to keep the sleeve in place.

In testimony whereof I have signed my name to this specification in the presence of two subscribing witnesses.

ALBERT WING WILSON.

Witnesses:
 GEO. M. MITCHELL,
 A. B. SWAIN.